United States Patent [19]

Klein

[11] Patent Number: 4,695,099
[45] Date of Patent: Sep. 22, 1987

[54] WHEEL SPOKE ADJUSTER GUARD

[76] Inventor: Mark S. Klein, 76 Dewey Ave., Totowa, N.J. 07512

[21] Appl. No.: 852,056

[22] Filed: Apr. 15, 1986

[51] Int. Cl.⁴ .......................... B60B 7/00; B60B 1/00
[52] U.S. Cl. ............................... 301/37 SA; 301/104; 411/373; 411/431
[58] Field of Search .................. 301/5 B, 5 VH, 37 R, 301/37 P, 37 L, 37 SA, 104; 411/371, 372, 373, 429, 431

[56] References Cited

U.S. PATENT DOCUMENTS

| | | | |
|---|---|---|---|
| 2,269,670 | 1/1942 | Kieckbusch | 301/5 B |
| 2,475,451 | 7/1949 | Gouirand | 301/5 VH |
| 2,558,423 | 6/1951 | Dobrosky | 301/37 SA |
| 4,322,195 | 3/1982 | Rebish et al. | 411/431 |
| 4,372,593 | 2/1983 | Kesselman | 411/429 X |
| 4,521,146 | 6/1985 | Wharton | 411/429 X |

Primary Examiner—Robert B. Reeves
Assistant Examiner—Russell D. Stormer
Attorney, Agent, or Firm—Morgan & Finnegan

[57] ABSTRACT

A wheel spoke adjuster guard for protecting wheel spokes, wheel spoke adjuster lugs, and the wheel rim openings through which the adjuster lugs are recieved, of motorcycles, bicycles and the like, from the intrusion of foreign materials. The spoke adjuster guard comprises a plurality of semi-tubular sections adapted for lockable engagement to wrap around and closely surround the spoke adjuster lug and a portion of the adjacent wheel spoke, including the threaded end receivable in the spoke adjuster lug. Upon lockable engagement, the sections also engage the spoke so as to remain fixedly in place to protectively cover the spoke adjuster lug, the threaded end of the spoke, and the wheel rim opening receiving the spoke adjuster lug.

6 Claims, 7 Drawing Figures

WHEEL SPOKE ADJUSTER GUARD

BACKGROUND AND OBJECTS OF THE INVENTION

The present invention relates generally to spoke guards for bicycle wheels, motorcycle wheels, etc., and, more particularly, to devices capable of protecting the spoke adjuster and wheel rim areas of these wheels from the intrusion of foreign materials (e.g., dirt) which may hinder the proper functioning and reduce the life span of the spokes and wheel rim; while providing a decorative addition to the wheel.

Most bicycles, motorcycles, unicycles, and other vehicles having spoked wheels are provided with spoke-adjuster assemblies through which spoke tension may be adjusted to facilitate proper wheel alignment. Such assemblies usually comprise a series of spoke-adjuster lugs (one for each spoke), mounted in the wheel rim and having a threaded aperture through which the spoke can be threadably engaged or disengaged to increase or decrease spoke tension.

A common problem associated with the spoke adjuster and wheel rim areas concerns the accumulation of dirt or other foreign materials at the exposed threaded engagement between the spoke and spoke adjuster lug, and in the tire and tube area via the openings in the wheel rim through which the spoke adjuster lugs are received. Such accumulations can generally inhibit effective spoke adjustment, and may cause rusting in the spoke adjuster and rim areas, which, over time, will reduce the life span of the spoke and rim. Also, in the case of vehicles such as bicycles, the life span of the drive-chain and sprocket may be affected.

Simple spoke cover devices are well known in the prior art. See, for example, Speers et al., "Combination Drinking Straw And Wheel Spoke Cover", U.S. Pat. No. 3,796,370; Dobrosky, "Spoke Ornament For Bicycle Wheels", U.S. Pat. No. 2,558,423; and Gannon, British Pat. No. 1,348,663. These prior art devices basically consist of elongated or tubular members which snap or clip on to the spokes of a wheel to provide decorative ornamentation. Although these devices provide some satisfactory results, they do suffer several disadvantages.

First, since these devices are primarily designed for decorative purposes, their disclosures contain no teaching or suggestion that they can be fixedly attached in place so as to protectively cover the spoke adjuster and wheel rim areas. Secondly, while these devices may be designed to fit over the spoke-adjuster lugs and wheel rim openings, they are not capable of form-fitting to these areas so as to effectively inhibit the intrusion of foreign materials.

Accordingly, it is a principal object of the present invention to provide a spoke adjuster guard capable of keeping foreign materials out of the threads on either the spoke adjuster lug or the threaded end of the spoke received therethrough, and to prevent foreign materials from entering the tire and tube area through the wheel rim openings in which the adjuster lugs are mounted.

Another object of the present invention is to provide a spoke adjuster guard capable of prolonging the life of wheel spokes and rims, which in turn will prolong the life of the drive-chain and sprocket on vehicles such as motorcycles, bicycles, etc.

A still further object of the present invention is to provide a spoke adjuster guard capable of being mounted to and removed from the spoke adjuster area without necessitating the unthreading of the spoke from the adjuster lug, and such that spoke adjustment may be accomplished substantially unhampered by the presence of accumulation of foreign materials.

Another object of the present invention is to provide a spoke adjuster guard which can fixedly engage and form-fit the spoke adjuster area and wheel rim openings in which the adjuster lug is mounted.

Still another object of the present invention is to provide a spoke adjuster guard with a simple locking system capable of secure installation and easy removal.

Still another object of the present invention is to provide a spoke-adjuster guard capable of relatively simple and inexpensive fabrication and characterized by safe and durable construction.

Other objects and various further features of novelty will be pointed out and will occur to those skilled in the art in the following specification when taken in conjunction with the accompanying drawings.

SUMMARY OF THE INVENTION

The present invention is directed to a wheel spoke adjuster guard for protecting wheel spoke adjuster lugs, the threaded end of the wheel spoke threadable therethrough, and the wheel rim holes through which the spoke adjuster lugs are received. The spoke adjuster guard comprises a plurality (preferably a pair) of semi-tubular sections adapted to lockably engage each other to wrap around and closely surround the spoke adjuster lug and a portion of the wheel spoke, including the threaded end, and to fixedly engage said portion of the spoke so as to protectively cover the spoke adjuster lug, the threaded end of the spoke, and the wheel rim opening through which the spoke adjuster lug is received.

Each semi-tubular section contains an inner surface having a channel segment disposed longitudinally therein and from end to end thereof. The channel segments are proportioned to form a stepped cylindrical opening extending through the fully assembled spoke adjuster guard upon lockable engagement of the semi-tubular sections. Advantageously, the cylindrical opening is of varying width and proportioned to closely receive the spoke adjuster lug and the adjacent portion of the wheel spoke. Further, the assembled sections engage the spoke between the channel segments so as to fix the spoke adjuster guard in place.

Each semi-tubular section also contains cooperating coupling means for snapingly interlocking a pair of sections together. As preferably embodied, the sections are identical and have a tongue member projecting from one edge and a slotted tab member formed along the opposite edge, the tongue and slotted tab being proportioned and positioned on each section for releasable interlocking with any other section.

Additionally, the inner surface of each semi-tubular section contains a plurality of grooved depressions and rib-like projections disposed adjacent to and on opposed sides of each channel segment. The rib-like projections on one inner surface are proportioned and positioned to be received in the grooved depressions of another inner surface to provide flush mating of the semi-tubular sections in proper alignment.

DESCRIPTION OF THE PREFERRED EMBODIMENT

Figure 1A:
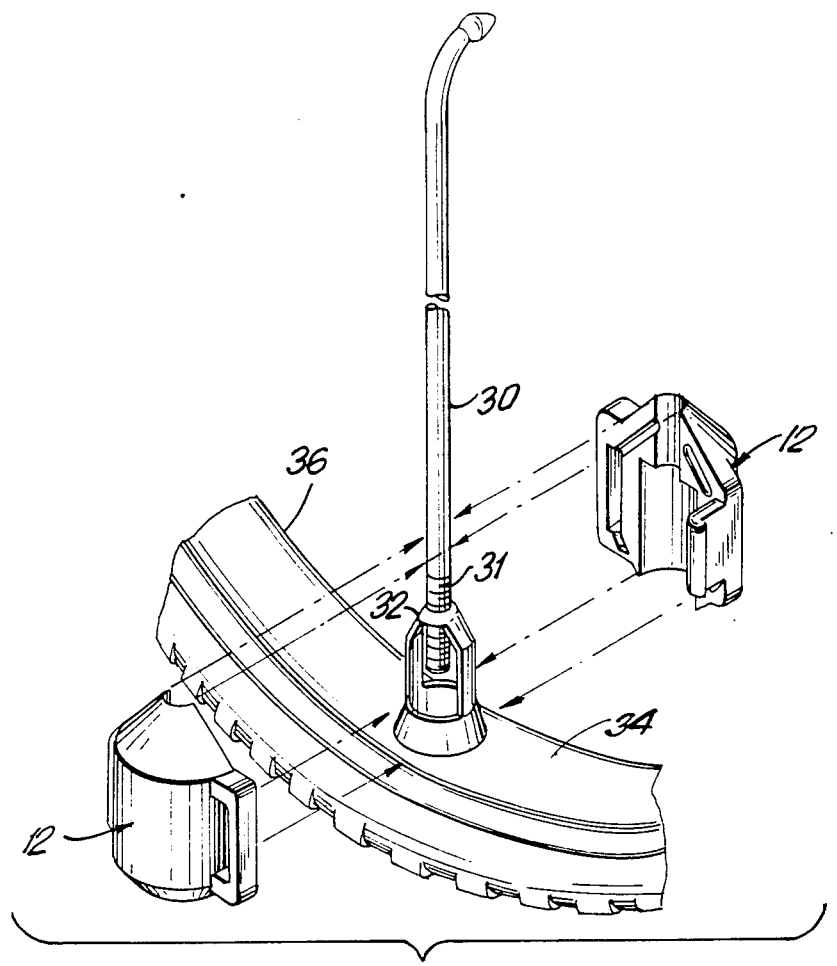
FIG. 1A is an exploded, partially cut-away view in perspective of a preferred embodiment of the spoke adjuster guard of the present invention.
Figure 1B:
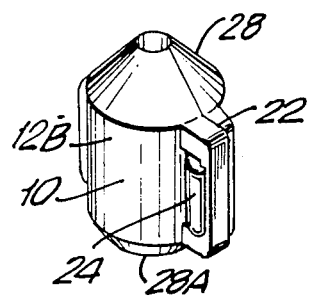
FIG. 1B is a view in perspective of the assembled wheel spoke adjuster guard of the present invention.

Referring now more particularly to the accompanying drawings, wherein like numerals designate similar parts throughout the various views, attention is directed first to FIGS. 1, wherein a preferred embodiment of the wheel spoke adjuster guard of the present invention is designated generally by reference number 10 (FIG. 1B). More specifically, spoke adjuster guard 10 comprises a pair of semi-tubular, interlockable sections 12 (FIG. 1A). Sections 12 are adapted to snapingly interlock together so as to wrap around and closely surround spoke adjuster lug 32 and a portion of spoke 30, including threaded end 31, and engage spoke 30 so as to fixedly cover threaded end 31, spoke adjuster lug 32, and the opening in wheel rim 34 through which spoke adjuster lug 32 is received. It will be appreciated that the present invention is particularly suited for use on motorcycles, especially those in off-road use, but is equally applicable to any type of spoked wheel for which protection of the spoke adjuster and wheel rim areas from the intrusion of foreign materials is desired.

As preferably embodied, there are two sections 12, each being constructed of a low density polyethylene material. It should be understood, however, that sections 12 may be constructed of any other desireable material conducive to achieving the objects of the invention as disclosed herein. Additionally, it should be understood that the sections 12 are not limited to any particular size or number, since two or more may be utilized as desired and may be dimensioned to enclose substantial portions of spoke 30. However, two identical sections are preferred because of the ease of fabrication.

Figure 2A:
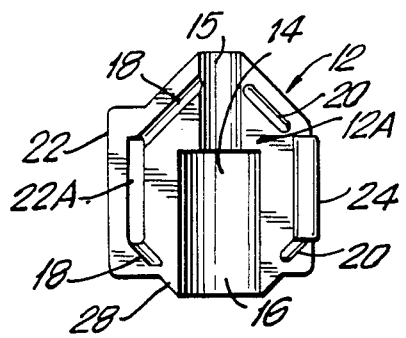
FIG. 2A is a sectional internal elevation view of one of the semi-tubular sections comprising the wheel spoke adjuster guard of FIG. 1B.
Figure 2B:
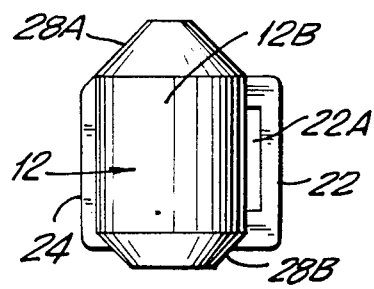
FIG. 2B is an external elevation view of one of the semi-tubular sections comprising the wheel spoke adjuster guard of FIG. 1B.
Figure 2C:
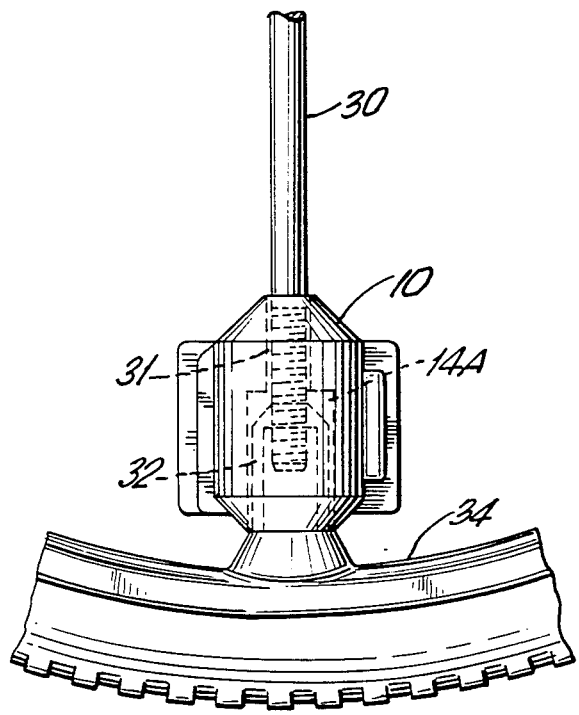
FIG. 2C is an external elevation view of the lockably engaged semi-tubular sections comprising the spoke adjuster guard of FIG. 1B as fixed in place to wrap around and closely receive the spoke and spoke adjuster lug, and cover the wheel rim opening receiving the adjuster lug.

Referring now to FIGS. 2, it can be seen that each section 12 has an inner surface 12A and an outer surface 12B formed integrally therewith (FIGS. 2A and 2B). As preferrably embodied, each inner surface 12A contains a channel segment 14, disposed longitudinally therein and extending from end to end thereof (FIG. 2A). Each channel segment 14 is composed of contiguous sub-segments 15 and 16. Sub-segments 15 and 16 are dimensioned to accommodate spoke 30 and spoke adjuster guard 32, respectively, upon full assembly of sections 12 as described below. Sections 12 are preferably adapted to snapingly interlock together, with the pairs of sub-segments 15 and 16 abuttingly aligned so as to define stepped cylindrical opening 14A (FIG. 2C) extending through the entire spoke adjuster guard, through which spoke 30 and spoke adjuster lug 32 are closely received. Additionally, aligned sub-segments 15 will engage spoke 30 so that the spoke adjuster guard may be fixed in place. It should be understood, however, that the fixed engagement of sections 12 about spoke 30 will not hinder spoke adjustment, since the smooth surfaces of aligned sub-segments 15 will enable spoke 30 to be threadably adjusted therebetween. Alternatively, the entire spoke adjuster guard may be rotated along with the threadable movement of spoke 30.

According to another aspect of the invention, and as preferably embodied, inner surface 12A of each section 12 is provided with grooved depressions 18 and rib-like projections 20, said depressions and projections being disposed in each section 12 along opposite sides of channel segment 14 (FIG. 2A). In accordance with the invention, the lockable engagement of sections 12 will cause the rib-like projections of one section to interlock, in tongue-and-groove fashion, with the grooved depressions of the other section such that said inner surfaces are flushly mated together and maintained in proper alignment. It should be understood that neither the number nor the configuration of depressions 18 and projections 20 is limited to that exemplified in the accompanying drawings. Rather, depressions 18 and projections 20 may be provided in various quantities and arranged in any manner to achieve their mating and alignment functions while maintaining the structural integrity of each section 12.

Figure 2D:
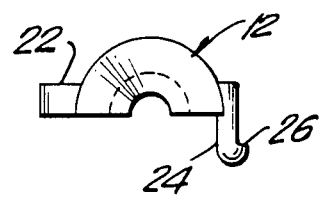
FIG. 2D is a top view of one of the semi-tubular sections comprising the spoke adjuster guard of FIG. 1B.
Figure 2E:
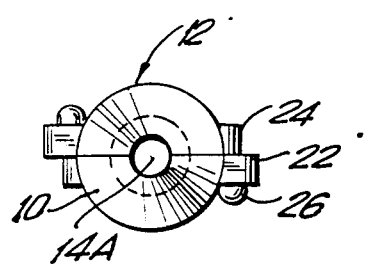
FIG. 2E is a top view of the interlocked semi-tubular sections illustrating the coupling means therefor.

According to still another aspect of the invention, each section 12 is provided with cooperating coupling means which releasably interlock for assembling and disassembling the sections. In accordance with the invention, each section 12 is provided with a slotted tab member 22 disposed on one side thereof and extending laterally outward therefrom, each tab member having a slotted opening 22A therethrough (FIGS. 2A and 2B). Each section 12 is also provided with tongue member 24, each tongue member having a lip portion 26 disposed along the length thereof, and extending perpendicularly outward from each section 12 in directly opposed placement to slotted tab member 22 (FIG. 2D). To interlockingly engage sections 12, the tongue member of one section is inserted into the slot 22A and snapped together with slotted tab member 22 of the other section, such that lip portion 26 engages receiving member 22 to lock the sections together (FIG. 2E).

Additionally, and as preferably embodied, each section 12 is provided with tapered end portions 28 and 28A (FIGS. 2B). It should be understood, however, that this feature does not limit the invention as disclosed herein, since end portions 28 and 28A may be of any configuration consistent with the objects of the invention; for example, squared-off or rounded.

It will be readily appreciated, however, that since numerous modifications will readily occur to those skilled in the art after consideration of the foregoing specification and accompanying drawings, it is not intended that the invention be limited to the embodiment disclosed herein. Rather, all suitable modifications and equivalents may be resorted to which fall within the scope of the appended claims. Having described the invention,

What is claimed is:

1. A wheel spoke adjuster guard for wheel spoke adjuster lugs and adjacent wheel spoke, as well as the wheel rim holes through which said wheel spoke adjuster lugs are received, each wheel spoke adjuster guard comprising:

a pair of substantially identical interlocking semi-tubular sections, each said pair of semi-tubular sections being interlockable to form a substantially unitary tubular member proportioned to surround an adjuster lug; and identical cooperating coupling means on each said semi-tubular section for interlocking the semi-tubular sections in each said pair thereof to form the unitary tubular member, said tubular member, when assembled, providing a hollow central channel extending longitudinally therethrough, said channel being proportioned to encase and closely surround said wheel spoke adjuster lug and at least a portion of its adjacent wheel spoke, and to fixedly engage said portion of said wheel spoke so as to protectively cover said wheel spoke adjuster lug, said adjacent wheel spoke, and said wheel rim opening through which said wheel spoke adjuster lug is received.

2. THe wheel spoke adjuster guard according to claim 1, wherein each said semi-tubular section comprises:

an inner surface and an outer surface formed integrally therewith, each said inner surface having a channel segment disposed longitudinally therein and from end to end thereof, said channel segments adapted for abutting alignment upon lockable engagement of said semi-tubular sections so as to define a cylindrical opening through which said spoke adjuster lug and said portion of said wheel spoke are closely received, and so as to engage said portion of said wheel spoke therebetween 3. The wheel spoke adjuster guard according to claim 2, wherein each said channel segment comprises;

a first sub-segment, said first sub-segments abuttingly alignable upon lockable engagement of said semi-tubular sections so as to closely receive and engage said portion of said wheel spoke; and a second sub-segment formed contiguously with said first sub-segment, said second sub-segments abuttingly alignable upon lockable engagement of said semi-tubular sections so as to closely receive said wheel spoke adjuster lug.

4. A wheel spoke adjuster guard for a wheel spoke adjuster lug, its adjacent wheel spoke and the wheel rim hole through which the wheel spoke adjuster lug is received, comprising:

a plurality of interlocking partial-tube sections which form the complete wheel spoke adjuster guard when assembled together, each said partial-tube section having an inner surface and an outer surface, each said inner surface providing a channel segment disposed longitudinally of said partial-tube section to form a passage through said complete wheel spoke adjuster guard, each said channel segment comprising a first sub-segment and a second sub-segment formed contiguously therewith, said first sub-segments providing a first annular channel segment when said partial-tube sections are interlocked to form a complete wheel spoke adjuster guard, said first annular channel segment proportioned to closely surround a portion of the wheel spoke, and said second sub-segments providing a second annular channel segment when said partial-tube sections are interlocked, said second annular channel segment proportioned to closely surround the wheel spoke adjuster lug, said first and second sub-segments defining a continuous passage through said interlocked partial-tube sections; and cooperating coupling means disposed on each said partial-tube section for interlocking said sections together to form a complete wheel spoke adjuster guard, said coupling means comprising a tab member disposed on one side of each said partial-tube section and extending laterally outward therefrom, said tab member having a slotted opening therethrough, and a tongue member formed on the other side of each said partial-tube section, each tongue member having a lip portion disposed along the length thereof and extending perpendicularly outward from each said partial-tube section in directly opposed placement to said tab member, said tongue member of one of said partial-tube sections insertable through said slot in the tab member of another of said partial-tube sections for interlocking said partial tube sections together to form the complete wheel spoke adjuster guard.

5. The wheel spoke adjuster guard according to claim 4, wherein said inner surface of each said semi-tubular section further contains:

a plurality of grooved depressions and rib-like projections disposed adjacent to and on opposed sides of each said channel segment, said rib-like projections on one of said inner surfaces interlockable in tongue-and-groove fashion with said grooved depressions of another of said inner surfaces upon lockable engagement of said semi-tubular sections such that said inner surfaces may be flushly mated together and maintained in proper alignment.

6. The wheel spoke adjuster guard according to claim 5, wherein each said semi-tubular section further comprises inwardly tapered end portions.

* * * * *